(12) United States Patent
Potts et al.

(10) Patent No.: US 7,474,738 B1
(45) Date of Patent: Jan. 6, 2009

(54) SYSTEM AND METHOD FOR PROVIDING RECORDED MESSAGES ON A COMMUNICATIONS NETWORK

(75) Inventors: Karl W. Potts, Birmingham, AL (US); Henry R. White, Jacksonville, FL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 405 days.

(21) Appl. No.: 10/073,238

(22) Filed: Feb. 13, 2002

(51) Int. Cl.
  *H04M 1/64* (2006.01)
  *H04M 11/00* (2006.01)

(52) U.S. Cl. .................. 379/76; 379/88.16; 379/88.27

(58) Field of Classification Search ............ 379/221.08, 379/88.17, 88.22–88.28, 76, 265, 214
See application file for complete search history.

(56) References Cited

U.S. PATENT DOCUMENTS

| | | | | |
|---|---|---|---|---|
| 4,706,270 A | * | 11/1987 | Astegiano et al. ............... 379/2 |
| 5,544,232 A | * | 8/1996 | Baker et al. .............. 379/88.25 |
| 5,812,640 A | * | 9/1998 | Chawla et al. ........... 379/88.19 |
| 5,832,062 A | * | 11/1998 | Drake ...................... 379/88.16 |
| 5,884,262 A | | 3/1999 | Wise |
| H001802 H | * | 9/1999 | Erwin et al. ................ 379/243 |
| 6,035,018 A | * | 3/2000 | Kaufman .................. 379/88.17 |
| 6,215,858 B1 | * | 4/2001 | Bartholomew et al. ... 379/88.17 |
| 6,240,174 B1 | * | 5/2001 | Silver ......................... 379/230 |
| 6,259,771 B1 | | 7/2001 | Kredo |
| 6,266,399 B1 | * | 7/2001 | Weller et al. ............. 379/88.19 |
| 6,351,679 B1 | * | 2/2002 | Ainslie ........................ 700/94 |
| 6,385,305 B1 | | 5/2002 | Gerszberg |
| 6,411,955 B1 | | 6/2002 | Eads |
| 6,438,594 B1 | * | 8/2002 | Bowman-Amuah ......... 709/225 |
| 6,631,181 B1 | * | 10/2003 | Bates et al. .............. 379/88.18 |
| 6,857,024 B1 | * | 2/2005 | Chen et al. .................. 709/231 |
| 2003/0007625 A1 | * | 1/2003 | Pines et al. ................. 379/223 |
| 2004/0179658 A1 | * | 9/2004 | Lowmaster et al. ...... 379/88.17 |

* cited by examiner

*Primary Examiner*—Curtis Kuntz
*Assistant Examiner*—Joseph T Phan
(74) *Attorney, Agent, or Firm*—Withers & Keys, LLC

(57) ABSTRACT

A system and method is provided for providing, maintaining and accessing recording announcements in a telecommunications system. In the preferred embodiment, the system comprises at least one central office coupled to a telecommunication network. An announcement service node comprising a data schema and an application for accessing the data schema is coupled to the telecommunications network. The announcement service node is accessible by one or more central offices coupled to the telecommunications network. A storage mass is coupled to the announcement service node for storing recorded announcements.

12 Claims, 5 Drawing Sheets

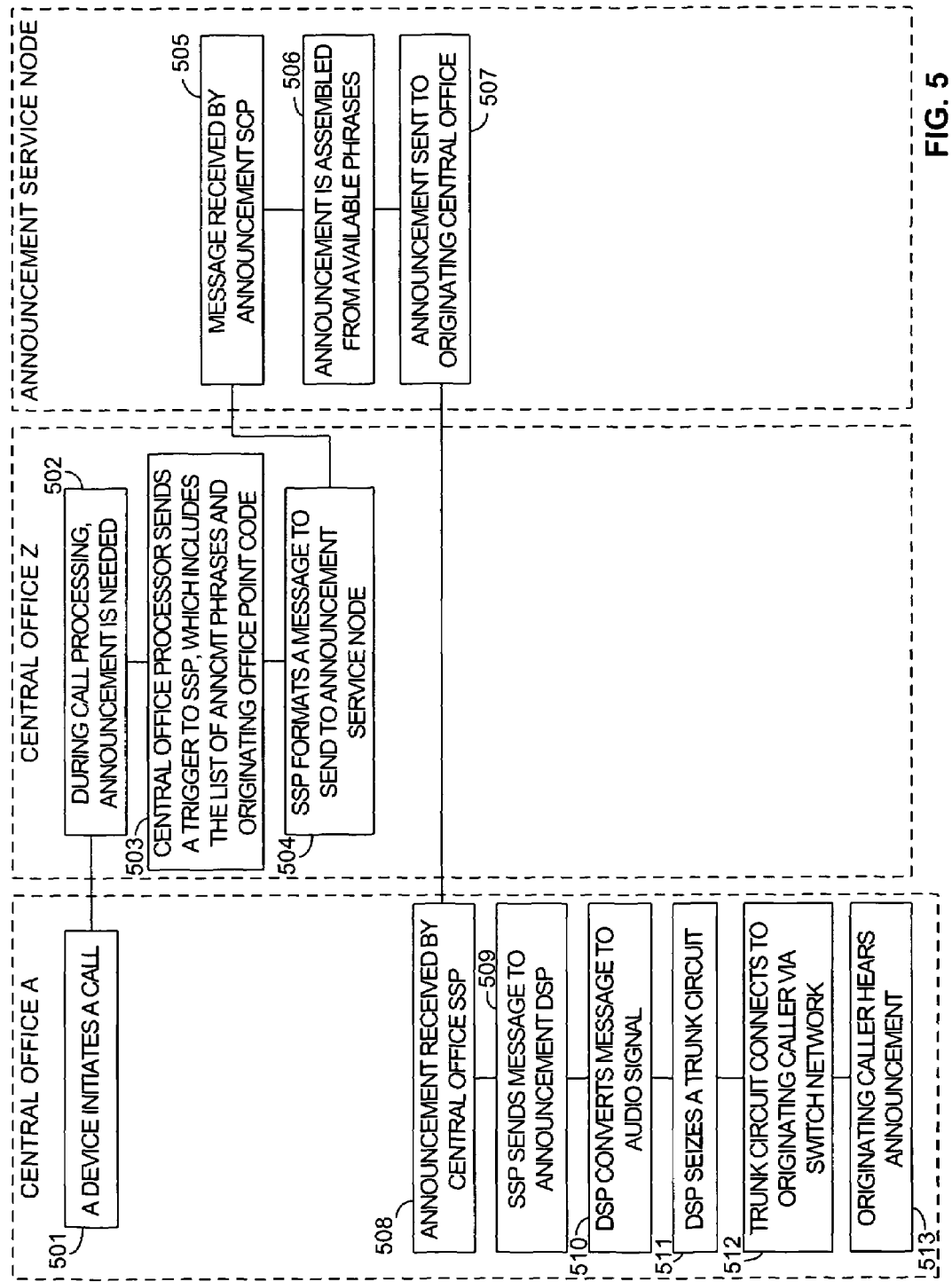

SYSTEM AND METHOD FOR PROVIDING RECORDED MESSAGES ON A COMMUNICATIONS NETWORK

FIELD OF THE INVENTION

The present invention relates to a method and apparatus for providing recorded announcements on a communications network that is used by a telephone service provider or businesses including, for example, airlines, banking services, travel agencies, polling services and the like. More particularly, the present invention relates to a system and a method for providing a centralized recorded announcement data schema for use with one or more central offices of a telecommunications system.

BACKGROUND OF THE INVENTION

Numerous businesses use recorded announcements to convey information to their customers via a communications network. The use of recorded announcements is widespread and rapidly growing in today's global economy. For example, most, if not all, telecommunication companies use hundreds of recorded announcements to notify callers of call status, service status, available services, employment opportunities, account balances and the like. Similarly, banking services use thousands of recorded announcements to inform customers of, for example, account status, lending opportunities, payment options, credit rates, billings and various other services. Most establishments use recorded announcements to route calls, receive automated purchase information, generate sales, perform sales promotions and provide other automated customer services. Polling services use recorded announcements to respond to calls, issue questions to callers and generate responses to data input by callers. Hospitals, governmental agencies and other large entities often employ recorded announcements both internally and externally for applications with callers. As yet another example, many airline services use hundreds of recorded announcements to inform passengers of flight status, ticket information and the like. The travel services industry is another business sector that utilizes systems with recorded announcements. Most travel agencies, car rental services, hotels and the like handle transactions with recorded announcements. Many companies use "in-house" communication systems with "pick up" phones that play announcements when a user picks up the telephone (e.g., a car rental agency, hotel or the like, with a "pick up" telephone at a front desk or reception counter).

Most telecommunication systems employ one or more central offices (CO) on a network. Typically, each CO has recorded announcement equipment coupled to a switch network via a series of trunks. A trigger somewhere in the network is used to identify which recorded announcement(s) is (are) required for a communication on the network. The switch network routes incoming calls to a trunk. Each trunk is associated with one or more recorded announcements on the recorded announcement equipment. With existing systems and methods, recorded announcements are loaded on the recorded announcement equipment according to the needs of each central office. In most cases, at least a portion of the announcements that are available at one central office is common to two or more central offices on a network. For example, the announcements for a particular central office may be common to all of the telephone subscribers serviced on a local access transport area (LATA).

Currently, when new recorded announcements become available, or existing recorded announcements require maintenance and the like, work assignments must be made to update announcements in one or more of the central offices that use those announcements. When this occurs, using known systems, an announcement tape must be loaded in each central office. This arrangement is often time consuming and costly. For example, maintaining recorded announcements at numerous locations imposes significant labor efforts to assign and maintain announcements in each central office.

FIG. 1 illustrates an exemplary architecture of known systems. In this example, subscribers of a telephone service provider access specific recorded announcements coupled to trunks in a central office 100. For example, caller 101 dials a code, e.g., "1+" or "800", that causes a trigger in hub 110 or alternatively in the central office 100, to initiate a query for a recorded announcement from recorded announcement equipment 150. Similarly, another caller 102 dials a defined service number and hub 110, recognizing this number, routes the call to an automated attendant function at central office 100. Finally, based on a sudden service outage for cellular calls in a certain region, cellular telephone caller 103 is identified as a cellular call by the network and routed to central office 100 via mobile telephone switching office (MTSO) 120 to receive service information, i.e., recorded announcements concerning the sudden service outage.

Thus, users (e.g., 101, 102, 103 . . . n) are connected to a central office 100 through a router 110, a distributing frame 115 and into a switch network 130. In this example, user 101 has dialed a number that requires a recorded announcement from the central office 100. A processor (not shown) recognizes that a user 101 requires a recorded announcement and connects the line through the switch network 130 to a trunk circuit 140 that is in communication with recorded announcement equipment 150. In most arrangements, the recorded announcement equipment is coupled directly to the switch. Typically, this architecture is repeated in one or more central offices throughout a network. Of course, the number and sizes of the central offices will vary, depending upon the size of the overall system, and other considerations.

Under most current situations, recorded announcements are loaded on recorded announcement equipment 150 by the use of a standard conventional audiocassette tapes 153. In some instances, recorded announcements are loaded onto, for example, a lap top personal computer 157 and then loaded onto recorded announcement equipment 150 via a cable 155.

Typically, for each recorded announcement there is an assigned trunk, or a path, to switch network 130. This configuration varies somewhat from one switch type to another. However, in the simplest terms, each announcement requires a trunk or path from the recorded announcement equipment 150 to the switch network 130. In switching systems such as the Lucent 1AESS™ and 5ESS™ switches, for example, most of the recorded announcement equipment interfaces with the switch network via an analog trunk circuit. The recorded announcement equipment in these switching systems has a channel for each announcement. This means that each channel is wired to a trunk circuit that also connects to the switch network. Accordingly, when an announcement must be added or changed at a central office, it is first loaded on the recorded announcement equipment 150 and then a trunk is wired into the switch network. The latest vintage of recorded announcement equipment that is used in 5ESS™ switching systems uses a 24-channel T-carrier interface. In this arrangement, all 24 channels of each recorded announcement unit are wired to a T-carrier system that then connects to the switch network. No additional wiring of channels is needed at the time when announcements are added or changed. However, these systems require loading of the announcements and occasional maintenance.

Typically in each central office, or perhaps in one location for a group of central offices, sets of tapes are maintained so that if for some reason one or more of the announcements becomes corrupted, announcements can be re-recorded from the tape(s) onto the recording announcement equipment 150. Similarly, when new services are added that involve recorded announcements, new tapes are made and delivered to the respective central offices so that they can be loaded onto the appropriate equipment at those central offices.

The recorded announcement equipment in Nortel Networks DMS™ and Siemens EWSD™ switching systems is similar to the latest vintage in 5ESS™ systems in that the equipment connects to the switching network via a multichannel link. No additional wiring is needed in the DMS™ and EWSD™ switching systems after the equipment is installed. However, these systems also require loading of the announcements and occasional maintenance.

Accordingly, using known systems, inventories of recorded announcements must be maintained for one or more central offices. Furthermore, care must be maintained to ensure consistency of the recorded announcements at all central offices. Another problem is that it is difficult to match recording levels across multiple devices at multiple central offices.

Accordingly, a need exists for a system and a method for requesting, provisioning and maintaining recorded announcements and related equipment for one or more central offices.

SUMMARY OF THE INVENTION

The present invention is a system and method that uses one or more announcement service nodes to provide recorded announcements to one or more central offices on a network. In a preferred embodiment, a processor at a central office or the like sends a query to one or more service nodes to retrieve an appropriate announcement in response to a received call. According to one embodiment of the present invention, at least one service node is provided for each local access transport area (LATA). Advantages of the invention include the ability to greatly reduce the number of locations at which recorded announcements must be maintained.

The present invention has numerous other advantages. For example, by implementing embodiments of the invention, most or all recorded announcements would be stored at centralized locations, thus reducing the effort required in assigning, managing and maintaining announcements. For example, according to embodiments of the invention, if a central office needs a new recorded announcement, nothing needs to be done except perhaps a translation change, rather than the conventional steps of assigning and wiring trunks, and loading tapes.

For example, according to one exemplary embodiment, a new announcement is loaded at a centralized location. Logic in software at the centralized location determines, according to events in call processing, when the new announcement needs to be delivered to one or more central offices. In some situations in which the new announcement is needed only at one or a few central offices, translation changes may be needed. A translation change is a software entry in the program in the main processor that controls the operation of the switching system. A translation change would include information regarding the new announcement, such as the situation that requires the announcement, and the message to send requesting the announcement from the centralized location. Implementing a translation is a relatively simple operation and can be administered from a location remote to the central office.

Other embodiments of the invention include applying the architecture of the invention to a network for providing announcements for marketing, account status, sales opportunities, employment information, availability, and information for airlines, hotels and the like. By implementing embodiments of the present invention, a more economical arrangement is available for small businesses, in particular, which may often require specialized announcements, but on a smaller scale. For example, a business that normally would be incapable of maintaining and implementing an announcement inventory on its own, could subscribe to, on a "per-use" basis, access to an inventory of recorded announcements available at a service node.

Embodiments of the invention employ a centralized database designed to provide a source of recorded announcements accessible by users and, preferably, updateable by one or more administrative entities.

BRIEF DESCRIPTION OF THE DRAWINGS

FIG. 5 is a flowchart illustrating an exemplary announcement retrieval for office-specific announcements, according to an embodiment of the present invention.

DETAILED DESCRIPTION OF THE INVENTION

Figure 1:
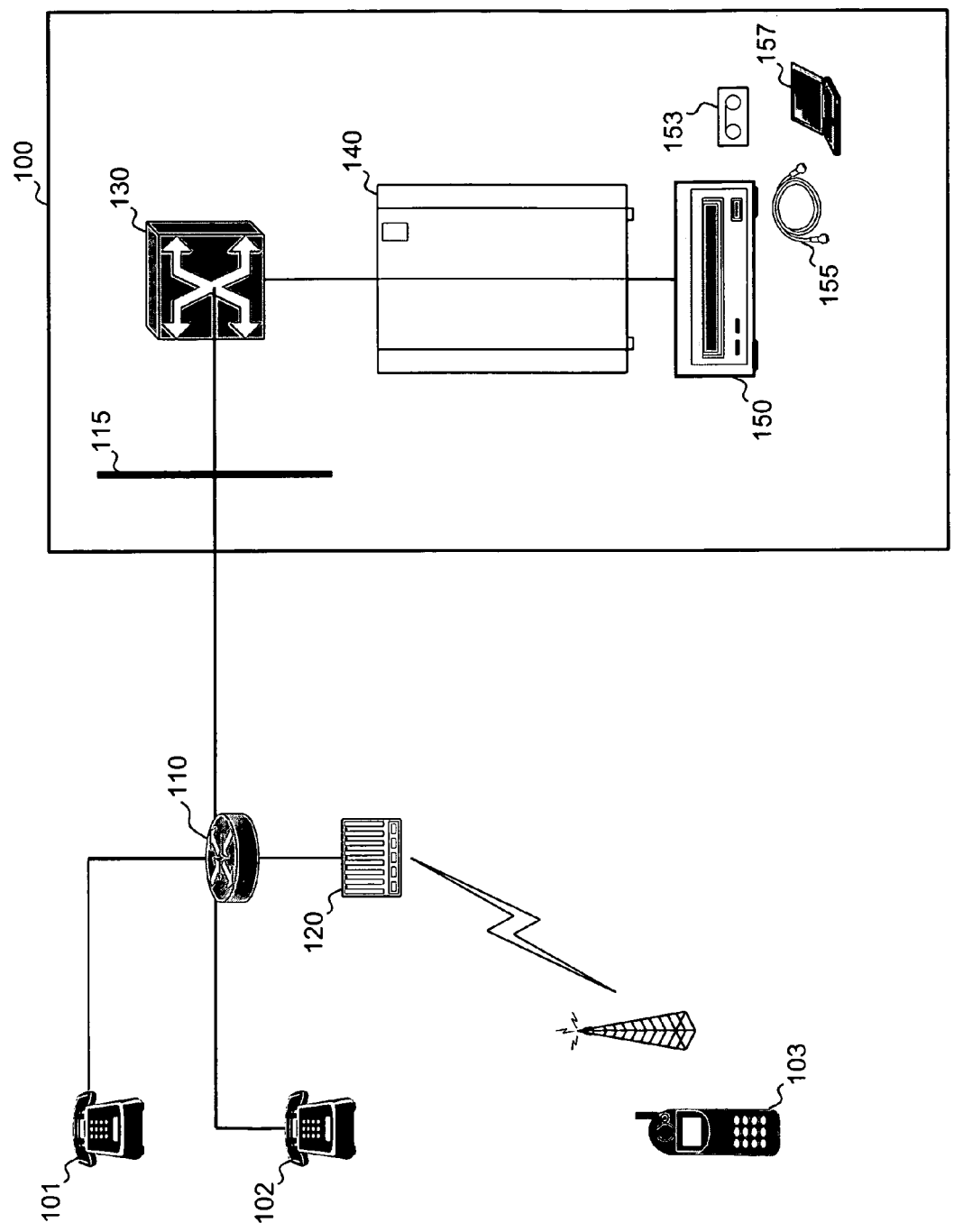
FIG. 1 is a schematic diagram of an overview of a known telecommunication system implementing a known exemplary recorded-announcement architecture.
Figure 2:
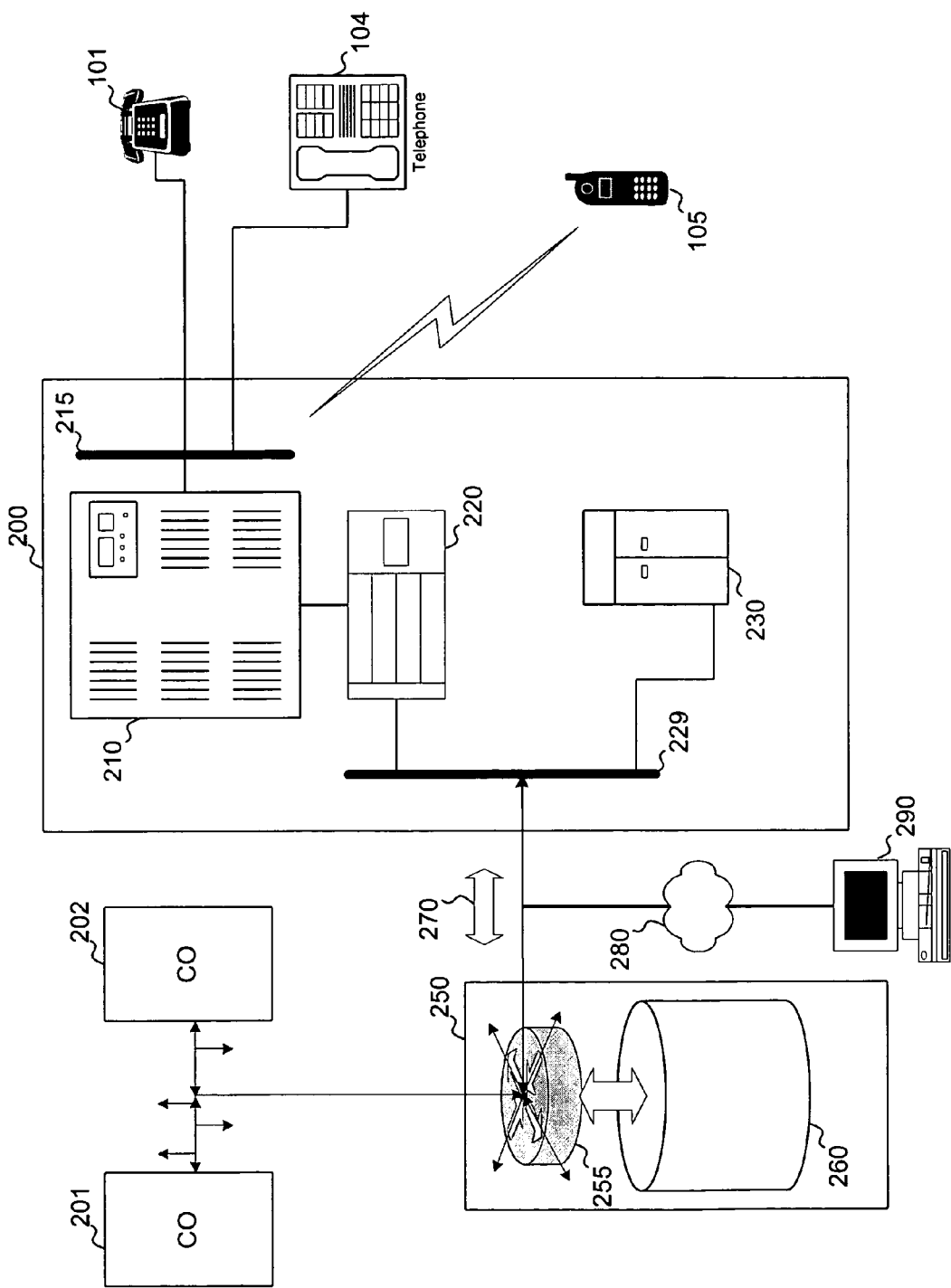
FIG. 2 is a schematic diagram of an overview of a system architecture according to an embodiment of the invention.

Referring to FIG. 2, an exemplary embodiment of the present invention will now be described. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in schematic block diagram form. Furthermore, one skilled in the art can readily appreciate that the specific sequences in which methods are presented and performed are illustrative and it is contemplated that the sequences can be varied and still remain within the spirit and scope of embodiments of the present invention.

FIG. 2 depicts an exemplary application of the present invention. Customers (e.g., 101, 102, 103 . . . n) (i.e., subscribers to a telephone service provider, Intranet clients, employees of a company, members of a poll, and the like) are connected to a central office 200 via distributing frame 215 into a switch network 210. Central office 200 is connected to one or more trunks 220 and a frame 229 that includes an announcement digital signal processor 230. In turn, central office 200 is coupled to an announcement service node 250. Central office 200 serves as one central office on a LATA. Central offices 201, 202 are also part of the LATA and are coupled to service node 250.

Announcement service node 250 comprises a router 255 and data schema 260. Data schema 260 may be in the format of a relational database (e.g., Oracle™ databases), Lightweight Directory Access Protocol (LDAP) or other known data storage architectures. In this example, when a device 101 initiates a call on the network, a processor (not shown), for example, initiates a query 270 to announcement service node 250 with a request that indicates a particular call scenario. For example, the processor may be located on or next to switch 210, communicating with service node 250 via trunk 220. The routing is determined by whatever the trigger (not shown) requests. In the preferred mode, service node 250 interprets the query and decides what announcement(s) is (are) needed. Service node 250 then sends the needed announcements back in packet-size form 270, for example, to the central office 200. An announcement DSP 230 takes the packet-size file (or signal) and converts it into a voice file and connects it to the switch network 210 via a trunk circuit 220. The switch network 210 routes the recorded announcement to customer 101. Of course, the announcement may be delivered to a voice file, subscriber, customer or other network application. Callers 104 and 105 are routed to announcements in a similar manner.

Figure 3:
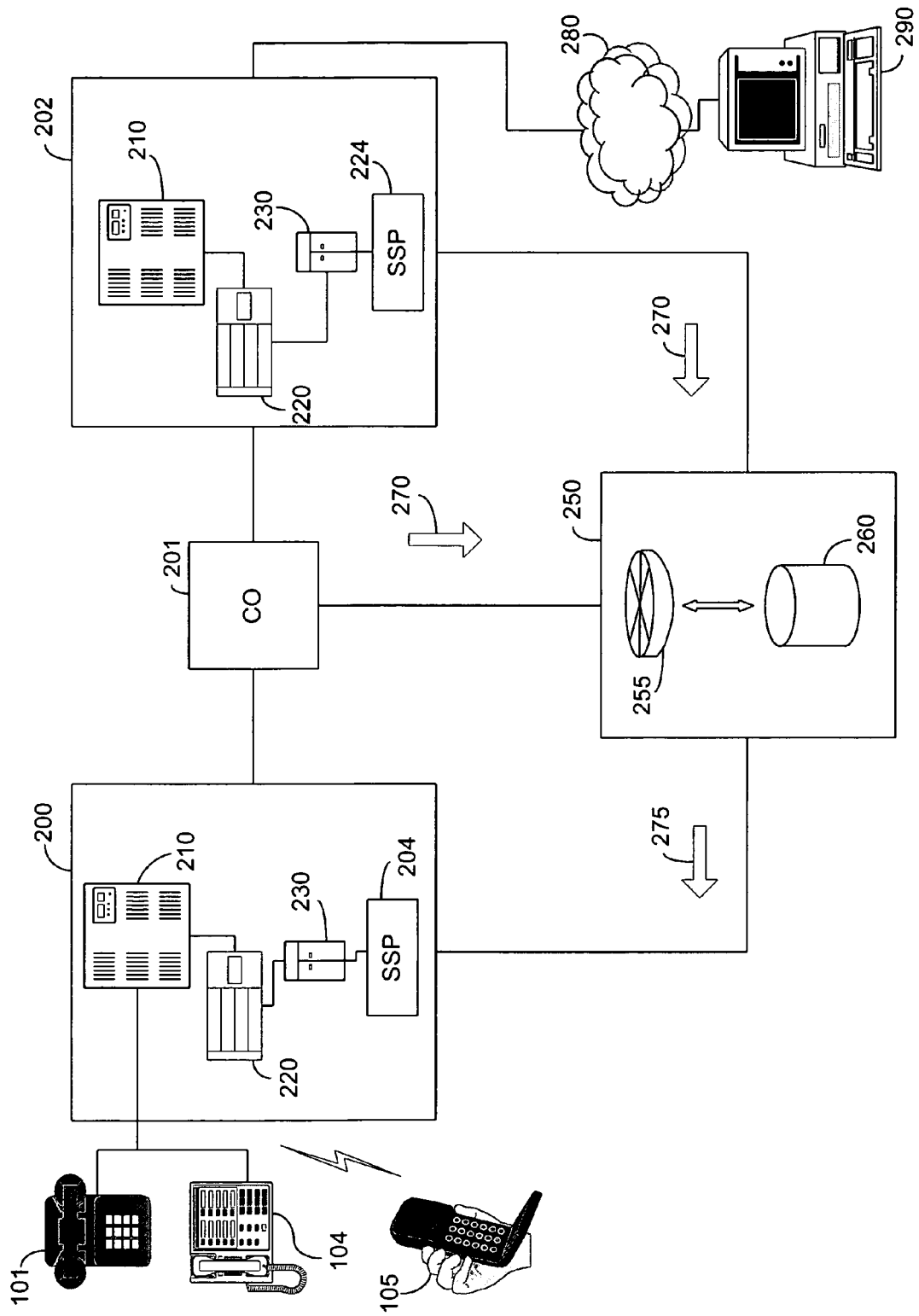
FIG. 3 is a schematic diagram of an overview of a system architecture according to another embodiment of the invention.

Referring to FIG. 3, another exemplary architecture is shown according to an embodiment of the present invention. In this example, when a device 101 initiates a call on the network, there may be a call scenario that requires an announcement. At the point in the network where the call processing triggers the need for an announcement, the processor (not shown) in the central office sends a message to service switching point (SSP) 224. SSP 224 formats a message 270 to send to announcement service node 250. Message 270 is sent to service node 250 via SS7 network links or a trunk circuit.

Message 270 falls into one of two main categories. Message 270 either includes a call scenario that will be interpreted by announcement service node 250, or includes a list of phrases that are needed to meet a particular call-processing requirement.

Figure 4:
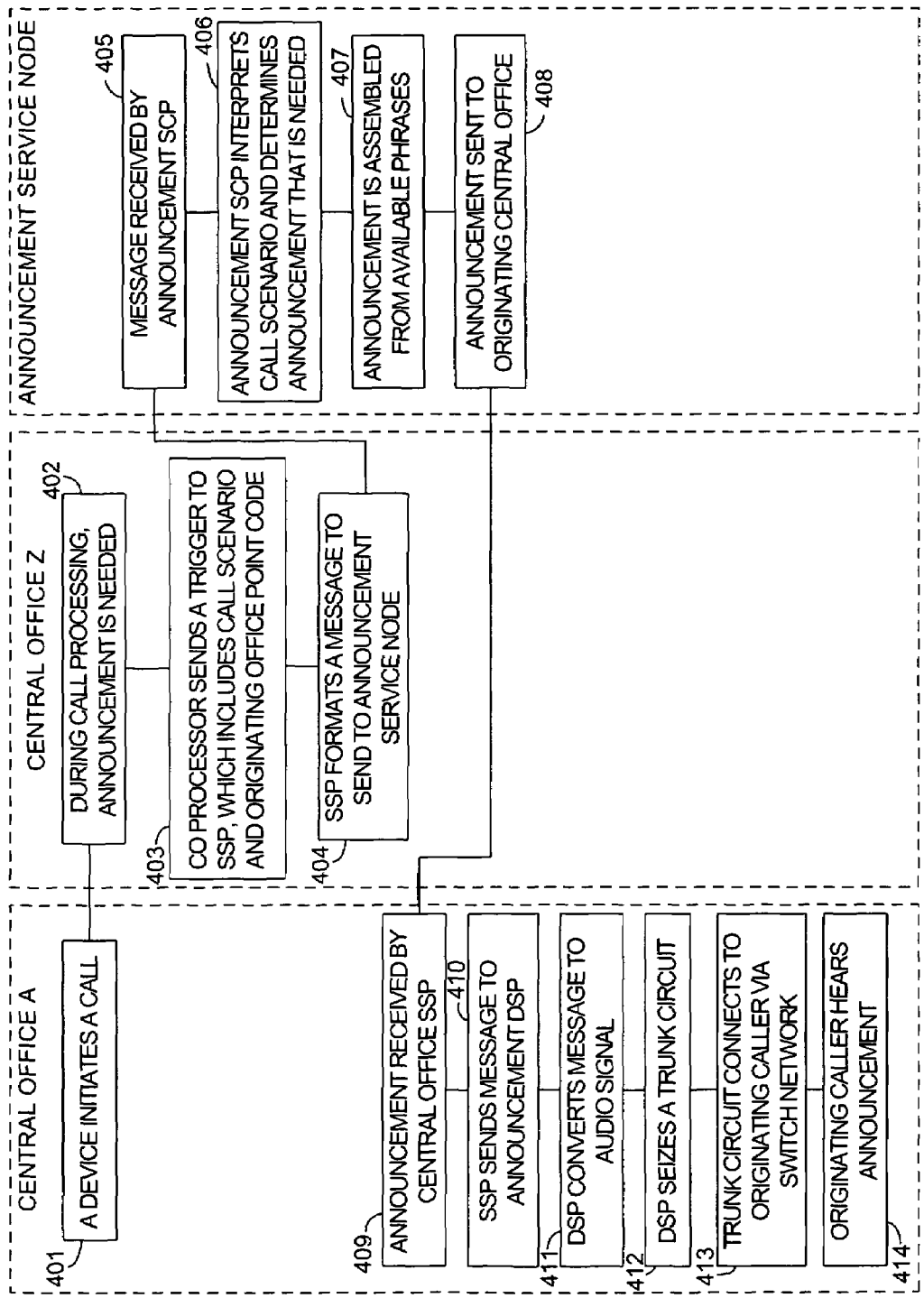
FIG. 4 is a flowchart illustrating an exemplary announcement retrieval for standard announcements, according to an embodiment of the present invention.

FIGS. 4 and 5 provide flowcharts that describe two embodiments utilizing these types of announcement requests. Referring to FIG. 4, a first embodiment provides announcement retrieval for standard announcements, in which service node 250 determines the phrases that are needed based on the received call scenario. As shown, this first embodiment begins in step 401 with a device initiating a call at a central office A. At a central office Z, in step 402, during call processing, an announcement is needed. In step 403, the processor of central office Z sends a trigger to the SSP, which includes the call scenario and originating office point code. In step 404, the SSP formats a message to send to the announcement service node.

At the announcement service node, in step 405, the announcement SCP receives the message. In step 406, the announcement SCP interprets the call scenario and determines the announcement that is needed. In step 407, the announcement is assembled from available phrases. Then, in step 408, the announcement is sent to the originating central office A.

At central office A, in step 409, the central office SSP receives the announcement. The SSP then sends the message to the announcement DSP in step 410. The DSP converts the message to an audio signal in step 411 and seizes a trunk circuit in step 412. In step 413, the trunk circuit connects to the originating caller via the switch network. Finally, in step 414, the originating caller hears the announcement.

Referring now to FIG. 5, a second embodiment provides announcement retrieval for office-specific announcements, in which the list of phrases is already determined by the requesting central office. As shown, this second embodiment begins in step 501 with a device initiating a call at a central office A. At a central office Z, in step 502, during call processing, an announcement is needed. In step 503, the processor of central office Z sends a trigger to the SSP, which includes the list of announcement phrases and originating office point code. In step 504, the SSP formats a message to send to the announcement service node.

At the announcement service node, in step 505, the announcement SCP receives the message. In step 506, the announcement is assembled from available phrases. Then, in step 507, the announcement is sent to the originating central office A.

At central office A, in step 508, the central office SSP receives the announcement. The SSP then sends the message to the announcement DSP in step 509. The DSP converts the message to an audio signal in step 510 and seizes a trunk circuit in step 511. In step 512, the trunk circuit connects to the originating caller via the switch network. Finally, in step 513, the originating caller hears the announcement.

In either of the embodiments of FIGS. 4 and 5, the list of phrases is assembled into an announcement in a compressed, packetized format. Referring again to FIG. 3, compressed announcement 275 is sent to central office 200 via SS7 links to SSP 204. SSP 204 routes the announcement to announcement DSP 230, which converts the compressed announcement to audio format. DSP 230 seizes a speech path to trunk circuit 220, which is connected by switch network 210 to customer 101. Of course, the announcement may be delivered to a voice file, customer premises equipment or other network application. Callers 104 and 105 may be routed to announcements in a similar manner.

The queries involved in the embodiments of FIGS. 4 and 5 would be similar to the queries used in the 800 Line Information Database (LIDB) implementation. For example, the service switching point in a central office would generate a Transaction Capabilities Application Part (TCAP) message that would flow down through layers in the SS7 Protocol for transport to a service control point (SCP) 260, which is part of announcement service node 250. The Transaction Portion of the TCAP message would be a "Query Message" Transaction Type. The TCAP Component Part would be an "Invoke" type to request the appropriate announcement based on the call scenario as specified in the Parameter Set, or to request an announcement based on a list of phrases as specified in the Parameter Set. SCP 260 would return a TCAP message with the requested announcement contained in the Parameter Set.

As described above and shown in the exemplary figures depicting embodiments of the invention, multiple central offices 201, 202 can be connected to service node 250. Preferably, each central office initiates requests 270 for announcements 275 from announcement service node 250. At the physical layer, a number of protocols for the requests (queries) are applicable, including X.25, DS0 and now DS1. The transport of announcements from SCP 260 to a central office will require the use of compression techniques such as Pulse Coded Modulation (PCM) or Adaptive Differential PCM (ADPCM) to conserve capacity.

According to one embodiment (referring either to FIG. 2 or 3), a central office 200 provides the service node 250 with a customer identification code, e.g., a phone number, Dialed Number Identification Service (DNIS), Automatic Number Identification (ANI), or other identification means, and service node 250 provides central office 200 with a customer identification file. The file may contain a name or other information related to the customer, including one or more personalized recorded announcements. In this manner, each service node can store personalized recorded announcements for a caller 101. For example, a telephone service provider could offer a service in which a subscriber can record personal greetings for specific callers to that subscriber's home or business telephone (e.g., the message "Happy Birthday" to the caller with a particular telephone number).

As shown in FIGS. 2 and 3, announcement service node 250 can access one or more databases 260. Of course, database 260 can be one or more databases in one or more locations. Service node 250 may access files using a number of established means, including Btrieve™, ODBC (Open DataBase Compliant) implementations such as Remote Data Objects and ActiveX™ Data Objects or other structured query language (SQL) methods.

In another embodiment (referring either to FIG. 2 or 3), an administrator 290 accesses announcement service node 250 via an Intranet application 280 to service stored recorded announcements in database 260 remotely. Of course, an Internet application would be equally suitable and within the scope of the invention.

By implementing embodiments of the invention, if an announcement must be changed at a service node, any changes to the service node, depending on the system architecture, would be reflected in at least a portion of the network.

As will be appreciated, as new services are developed or other service needs are defined, new announcement phrases will be added to announcement service node 250. With the addition of call scenario logic in announcement service node 250, new announcements may be delivered to central offices without the need to change software translations in the central offices. Software translations in central office processors provide information about customer services and feature capabilities. If, in call processing, a situation occurs that triggers the need for an announcement, the call scenario may be transmitted to the announcement service node at which the logic resides to determine which announcement is needed. This determination is made without the need to change translations in the central offices. In other cases in which new call scenario triggers are needed, there may be a need to change central office translations or update software program logic. Translation changes in central offices may be administered remotely through the use of data links between a centralized maintenance center and the central offices.

In accordance with an embodiment of the present invention, instructions adapted to be executed by a processor to perform a method are stored on a computer-readable medium. The computer-readable medium can be a device that stores digital information. For example, a computer-readable medium includes a hard disk, a floppy disk, a tape and a compact disc read-only memory (CD-ROM), all as known in the art for storing software. A processor suitable for executing instructions adapted to be executed accesses the computer-readable medium. The term "adapted to be executed" is meant to encompass any instructions that are ready to be executed in their present form (e.g., machine code) by a processor, or require further validation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing announcements on a communications network comprising:

at least one central terminal for routing communications on the communication network and in communication with the network, the at least one central terminal further comprising an announcement digital signal processor in communication with the incoming call, wherein the announcement digital signal processor converts one or more digital packet files to voice signals;

an announcement service node coupled to the at least one central terminal further comprising a data schema and an application server for accessing the data schema;

wherein the announcement service node is accessible by more than one central terminal coupled to the communications network, wherein said data schema comprises a storage mass for storing a plurality of recorded announcement digital packet files, the plurality of recorded announcement digital packet files including digitized announcement phrases for callers on the communications network; and wherein a call from an individual is connected to the announcement digital signal processor at the at least one central terminal, with the at least one central terminal determining a list of announcement phrases required for at least one announcement, the central terminal sending a request to the announcement service node that includes the list of announcement phrases required for the at least one announcement, the announcement service node receiving the list of announcement phrases required and assembling the digitized announcement phrases into the at least one announcement, the announcement digital signal processor receiving the at least one announcement from the announcement service node while the call from the individual is connected to the at least one central terminal and converting the at least one announcement to a voice file so as to audibly convey information to the calling individual as the at least one announcement is played from the at least one central terminal during the call.

2. A system according to claim 1, wherein said storage mass comprises a relational database.

3. A system according to claim 1, wherein at least a portion of said recorded announcement digital packet files are managed by a Lightweight Directory Access Protocol.

4. A system according to claim 1, wherein said central terminal comprises a central office of a telephone service network.

5. A system according to claim 4, wherein said central office initiates queries to said announcement service node in X.25 protocol.

6. A system according to claim 1, comprising a plurality of central offices of a telephone service provider coupled to the service node of the telephone service provider.

7. A method of providing announcements to devices on a network for a telephone service provider comprising:
   coupling a request for at least one announcement from at least one central terminal on the network of the telephone service provider to a centralized announcement service node, the centralized announcement service node coupled to the at least one central terminal, the at least one central terminal comprising an announcement digital signal processor, the at least one announcement including information for a user who places calls on the service provider's network, wherein the at least one central terminal determines a list of announcement phrases required for the at least one announcement, then sends a request to the centralized announcement service node that includes the list of announcement phrases required for the at least one announcement;
   assembling by the centralized announcement service node, in response to receiving the list of announcement phrases required for the at least one announcement, at least one announcement file from a centralized storage mass that includes a plurality of recorded digitized announcement phrases corresponding to those of the list and is coupled to the centralized announcement service node and the service provider's network while a call from the user is connected to the announcement digital signal processor at the least one central terminal, wherein the centralized announcement service node and its coupled centralized storage mass are separated from the at least one central terminal, and wherein the centralized announcement service node provides access via subscription to the plurality of recorded digitized announcement phrases on a per-use basis;
   digitally compressing the at least one announcement file in response to the coupled request;
   providing at least one digitally compressed announcement file to the at least one central terminal in response to the coupled request while the at least one central terminal is connected to the user;
   converting the at least one digitally compressed announcement file to at least one voice file via the announcement digital signal processor;
   identifying the user based on a communication from the at least one central terminal; and
   playing at least one voice file from the announcement digital signal processor to the user, the user having placed the call to the service provider's network, to thereby audibly convey the information to the user during the call.

8. A method of providing announcements to devices on a network according to claim 7, comprising:
   identifying the user based on Dialed Number Identification Service (DNIS).

9. A method of providing announcements to devices on a network according to claim 7, comprising:
   identifying the user based on a code dialed by said user.

10. A method of providing announcements to devices on a network according to claim 7, comprising:
   identifying the user based on Automatic Number Identification (ANI).

11. A method of providing announcements to devices on a network according to claim 7, comprising:
   adding at least one digitized announcement phrase to said centralized storage mass; and
   providing a translation to a switch on the network correlating to the added at least one digitized announcement phrase.

12. A method of providing announcements to devices on a network according to claim 7, comprising:
   prioritizing a plurality of requests for announcements from one or more central offices on the network; and
   providing a plurality of announcements to said one or more central offices on the network.

* * * * *